US012570513B2

(12) United States Patent
Caffa et al.

(10) Patent No.: US 12,570,513 B2

(45) Date of Patent: Mar. 10, 2026

(54) ROTATING AND TRANSLATING CAPPING HEAD WITH STATIC DRIVE ASSEMBLY

(71) Applicant: AROL S.P.A., Canelli (IT)

(72) Inventors: Marco Caffa, Canelli (IT); Fabio Pregno, Canelli (IT); Denis Ruffino, Canelli (IT); Enrico Michele Capello, Canelli (IT)

(73) Assignee: AROL S.P.A., Canelli (IT)

( * ) Notice: Subject to any disclaimer, the term of this patent is extended or adjusted under 35 U.S.C. 154(b) by 34 days.

(21) Appl. No.: 18/838,660

(22) PCT Filed: Feb. 15, 2023

(86) PCT No.: PCT/IB2023/051359

§ 371 (c)(1),
(2) Date: Aug. 15, 2024

(87) PCT Pub. No.: WO2023/156909

PCT Pub. Date: Aug. 24, 2023

(65) Prior Publication Data

US 2025/0153988 A1 May 15, 2025

(30) Foreign Application Priority Data

Feb. 15, 2022 (IT) ........................ 102022000002780

(51) Int. Cl.
*B67B 3/20* (2006.01)

(52) U.S. Cl.
CPC .......... *B67B 3/2066* (2013.01); *B67B 3/2013* (2013.01)

(58) Field of Classification Search
CPC ... B67B 3/2066; B67B 3/2013; B67B 3/2033; B67B 2201/10; B67B 3/20; B67B 3/18; H02K 49/10
See application file for complete search history.

(56) References Cited

U.S. PATENT DOCUMENTS

| | | | |
|---|---|---|---|
| 5,584,161 | A | 12/1996 | Zanini et al. |
| 6,871,482 | B2 | 3/2005 | Cirio |

(Continued)

FOREIGN PATENT DOCUMENTS

| | | | |
|---|---|---|---|
| EP | 2790306 | A2 | 10/2014 |

OTHER PUBLICATIONS

International Search Report and Written Opinion of the International Searching Authority issued for International PCT Application No. PCT/IB2023/051359 on Jul. 4, 2023.

*Primary Examiner* — Anna K Kinsaul
*Assistant Examiner* — Nicholas E Igbokwe
(74) *Attorney, Agent, or Firm* — Howson & Howson LLP

(57) ABSTRACT

A capping head for applying pre-threaded caps to containers includes a rotating and translating shaft, a first electric motor for driving the rotary motion of the shaft, the motor having a stator and a rotor coaxially arranged around the shaft and mounted in a stationary housing so as to be decoupled from the shaft as far as the translational motion is concerned, and a first bushing, which is mounted at one end of the stationary housing, is passed through by the shaft and is arranged to transfer the rotary motion of the rotor to the shaft. The head further includes a second bushing that is mounted at a second end of the stationary housing, opposed to the first one, to seal the internal cavity thereof also at that second end, and is passed through by the shaft that is mounted in the same bushing in a freely rotatable manner.

16 Claims, 4 Drawing Sheets

(56) References Cited

U.S. PATENT DOCUMENTS 6,925,897 B2 * 8/2005 Cirio .................... B67B 3/2033 73/865.8
7,533,590 B2 5/2009 Cirio
7,685,796 B2 3/2010 Capelli et al.
7,836,664 B2 * 11/2010 Zanini .................. B67B 3/2033 53/317
8,561,377 B2 10/2013 Cirio
2004/0187441 A1 9/2004 Cirio
2005/0183388 A1 8/2005 Cirio
2010/0192514 A1 * 8/2010 Zanini ...................... B67B 3/10 53/303
2011/0131923 A1 * 6/2011 Schonfelder ............. B67B 3/28 53/287
2012/0001499 A1 * 1/2012 Makino ................. H02K 41/03 310/12.14
2012/0017539 A1 * 1/2012 Neufeld ................ H02K 41/02 310/12.14
2012/0311963 A1 * 12/2012 Fukuda ................ B67B 3/2073 53/317
2014/0139050 A1 5/2014 Rohner et al.
2015/0033667 A1 2/2015 Cirio
2019/0177145 A1 6/2019 Caffa et al.
2019/0248636 A1 8/2019 Caffa et al.
2020/0007015 A1 1/2020 Cipriani et al.
2020/0025636 A1 1/2020 Caffa et al.
2020/0048060 A1 2/2020 Caffa et al.
2020/0048061 A1 * 2/2020 Caffa ................... B67B 3/2093
2020/0078061 A1 3/2020 Penman et al.
2020/0087129 A1 * 3/2020 Caffa ................... B67B 3/2066
2020/0186020 A1 6/2020 Amerio et al.
2021/0139304 A1 * 5/2021 Secchi ................. B67B 3/2066
2021/0143721 A1 5/2021 Cipriani
2021/0148405 A1 5/2021 Amerio et al.
2023/0211992 A1 7/2023 Scaglione et al.
2023/0356957 A1 11/2023 Ruffino et al.

* cited by examiner

ROTATING AND TRANSLATING CAPPING HEAD WITH STATIC DRIVE ASSEMBLY

TECHNICAL FIELD

This invention relates to capping systems and more particularly it concerns a rotating and translating capping head, equipped with a static drive assembly, for applying prethreaded caps.

BACKGROUND ART

Capping heads are devices allowing applying a cap or plug onto the mouth of containers such as bottles, phials and so on. They are usually employed in capping assemblies or capping machines generally including a movable support moving a plurality of said heads by following a path along which the containers are conveyed. For instance, the capping heads are mounted on the periphery of the support that is made to rotate so as to sequentially bring the heads and the containers to a capping position. While being moved by the movable support, the capping heads are made to vertically translate downwards in order to reach the position of the mouth of the container to be capped and to rise again once capping is over. Moreover, in case of application of prethreaded caps (or screw caps), the capping heads are also made to rotate in order to tightly seal the cap on the container mouth.

The translational motion can be obtained by means of a mechanical cam extending along the whole advance path run by the movable support. Each capping head is then equipped with a small roller constrained to roll onto the mechanical cam and to follow the profile thereof, thereby causing the translation of the remaining head components. Rotation is instead imparted by means of an electrical actuator, more particularly a rotary or linear brushless motor. As an alternative to using cams, the translational motion too can be imparted by means of electrical actuators.

A problem occurring with capping heads is that the actuators driving the head rotation generally include parts that jointly translate with the heads and drag with them the cables for supplying the same actuators with power and for receiving and transmitting signals and commands. This entails the need to provide a suitable movable wiring that does not hinder the movements of the capping machine and is not disturbed by such movements. This is an expensive solution.

US 2012/001499 A1 discloses an actuator for imparting the translational and rotary motion to a rotating and translating shaft, wherein the power supply cables are connected to the outside of a frame in which the shaft is accommodated. This solves the above-mentioned problem concerning wiring. Yet, in this solution, which uses a first electric motor for driving the translational motion and a second electric motor for driving the rotary motion, the rotor of such a second motor is integral with the rotating and translating shaft. Such an arrangement has the drawback that the constant lifting and lowering of the rotor gives rise, in the capping machine, to a dynamic behaviour characterised by considerable and frequent inertial actions, resulting in both a higher power consumption and a greater wear intrinsic in constantly moving heavy weights.

US 2012/017539 A1 discloses a drive unit for imparting the translational and rotary motion to the rotating and translating shaft of a capping head, wherein each motion is generated by a respective motor mounted so as to remain stationary during the translational movements of the shaft. In an embodiment, the rotating and translating shaft includes a portion with square or trapezoidal cross section, housed inside a correspondingly shaped sleeve that is translatable jointly with the shaft and that is made to rotate by the motor driving the rotation. Such an arrangement has a complex construction. Indeed, the shaft comprises in the whole three components, namely a first component to which the translational motion is imparted by the first motor, the second, square or trapezoidal component and a third component equipped with the cap handling members, and such components are to be assembled together to form an integral assembly. Moreover, the provision of a slidable sleeve having substantially the same length as the portion with square cross section leaves the problems related with the constant lifting and lowering of relatively heavy weights substantially unsolved. In case of a shaft and sleeve assembly with trapezoidal cross section, this also results in a greater radial size than in the solutions making use of conventional shafts.

WO 2018/116241 A1 discloses an actuation unit for a capping head having a rotating and translating shaft, a first electric motor for driving the rotary motion, in which the rotor and the stator are coaxial with the shaft and are housed within a stationary body so that they are decoupled from the shaft as far as the translational motion is concerned and that no unit in the transmission chain of the rotary motion is translatable jointly with the shaft. A bushing closing the motor housing at the bottom end thereof has ribs on its inner surface engaging grooves in the outer surface of the shaft so as to transmit the rotary motion to the shaft. A second electric motor drives the shaft translation and acts as a "virtual cam".

As the skilled in the art knows, driving the translation by means of a virtual cam is necessary only for some specific applications, e.g. when very long axial strokes of the rotating and translating shaft are involved or when a same machine is to periodically operate on different capping curves. In most applications, the translational motion can instead be driven by a mechanical cam and this entails a much lower power consumption (about the half). The interest in making capping heads that can be easily adapted to either type of drive of the translational motion is therefore evident.

This adaptability is not possible with the head structure disclosed in WO 2018/116241 A1, where a close mechanical and functional interconnection between the actuators for both movements exists.

The same problem occurs with the head disclosed in EP 2790306 A2.

It is an object of the present invention to solve the problems of the prior art, by providing a capping head that can be easily adapted to driving the translation by means of either a mechanical cam or a virtual cam.

SUMMARY OF INVENTION

In order to obviate the drawbacks of the prior art, according to a first aspect of the invention a capping head is provided including: a rotating and translating shaft; a first electric motor for driving the rotary motion of the shaft, the motor having a rotor and a stator coaxially arranged around the shaft and housed inside a stationary housing so that they are decoupled from the shaft as far as the translational motion is concerned; and a first bushing, which is mounted at one end of the housing so as to seal the internal cavity thereof at such an end, is passed through by the shaft and is arranged to transfer the rotary motion of the rotor to the shaft thanks to the cooperation between ribs provided on an inner surface of the bushing and grooves provided on an outer surface of the shaft. The head further includes a second bushing that is mounted at a second end of the stationary housing, opposed to the first one, so as to seal the internal cavity thereof also at that second end and is passed through by the shaft, which is mounted in the same bushing in a freely rotatable manner. The first electric motor forms, together with the stationary housing and the first and second bushings, a self-standing module for driving the shaft rotation and said module can be associated, for driving the translational motion, either with a member carrying cam follower rollers arranged to cooperate with a mechanical cam along the whole of the path run by the head during a capping operation, or with a second electric motor arranged to impart the translational motion to the shaft.

Advantageously, the shaft is translatable jointly with a decoupling joint that is mounted at the shaft end proximal to the second bushing, is arranged to allow rotation of the same shaft about its axis and can be fastened, in a detachable manner and so as to be jointly translatable, either to the member carrying the cam follower rollers or to a piston that is made to move by the second electric motor according to a linear motion.

In an embodiment in which the translational motion is driven by a mechanical cam, the member carrying the cam follower rollers is associated with means for preventing, while the head is advancing along the cam, unwanted rotary movements of the same head possibly occurring during the translational motion.

In an embodiment in which the translational motion is driven by an electric motor, the decoupling joint is fastened to the piston through a rod transmitting the linear motion imparted to the piston by the electric motor.

Moreover, in such an embodiment, the second electric motor is housed inside a housing that is mounted so as to be stationary relative to the head, in such a way that the components of the second motor are decoupled from the movements of the piston, and hence of the shaft, as far as the translational motion is concerned.

Advantageously, the shaft has an axial cavity accommodating means for driving cap-handling members carried by the same shaft.

Advantageously, moreover, component-holding boxes are mounted onto the stationary housings of the first and, if provided, of the second electric motor, which boxes accommodate the electronic components for supplying the motor with power and controlling and monitoring the head operations, and cables for the power supply and the reception and transmission of signals, data and commands from and to the components terminate at said boxes.

In a second aspect, the invention also concerns a capping machine comprising at least one capping head made in accordance with the first aspect of the invention.

In case of a capping machine comprising a plurality of identical heads carried by a common support, the cables terminating at the individual heads advantageously connect in series, in pairs, alternate heads on the support, and the serially connected heads are in turn directly connected to a collector carried by the common support.

BRIEF DESCRIPTION OF DRAWINGS

The above and other features and advantages of the invention will become more apparent from the following description of preferred embodiments made by way of non-limiting example with reference to the accompanying drawings, in which.

DESCRIPTION OF EMBODIMENTS

Figure 1:
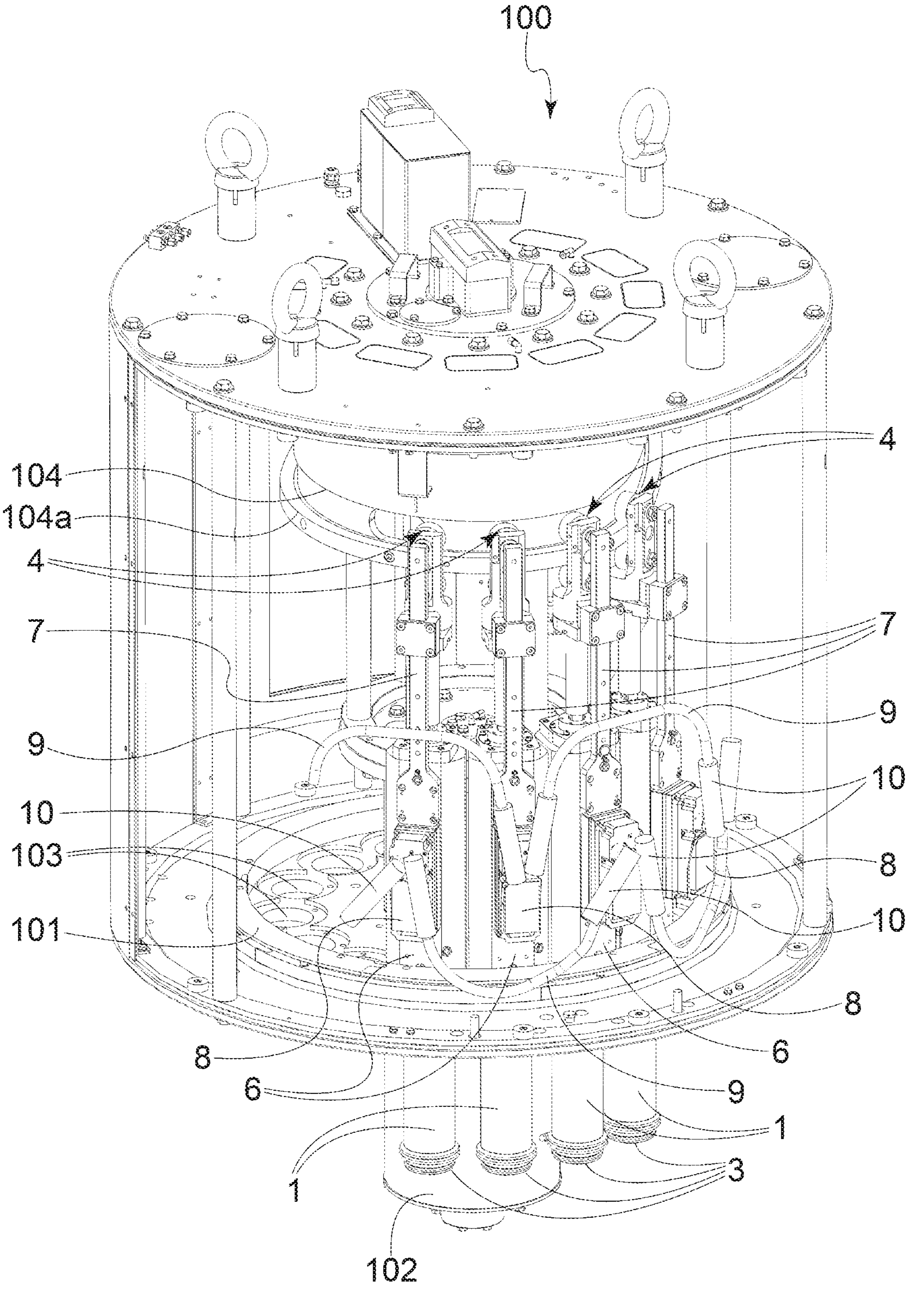
FIG. 1 is an isometric view of a capping turret equipped with capping heads according to the invention, in a first embodiment is which head translation is driven by a mechanical cam.

Referring to FIG. 1, a rotating capping machine or turret 100 is schematically shown, which is equipped with a plurality of heads 1 according to a first embodiment of the invention for applying screw caps onto containers such as bottles, phials and so on.

Heads 1 are carried by a platform 1 integral with a shaft 102 with vertical axis, which is made to rotate about its axis in order to take the containers to be capped (not shown in the Figure), bring the containers and the heads to a capping position and subsequently bring the capped containers to a position of removal from capping machine 100. Heads 1 are mounted in respective seats 103 on platform 1 so that their axes are parallel to the axis of shaft 102 and their lower ends are associated with cap-holding cones 3 and hence with the members for picking/releasing the caps.

As known, during rotation of turret 100, heads 1 are submitted to an axial translational motion which brings them from a raised idle position (top dead centre) to a lowered screwing position (bottom dead centre) and vice-versa, and to a rotary motion about their axes in order to screw the cap onto the container.

The above structure is wholly conventional and hence it will not be described in more detail.

In the present exemplary embodiment, the vertical translational motion is obtained thanks to the cooperation of heads 1 with a mechanical cam 104 carried by a frame stationary relative to turret 100, more particularly the cooperation with a radial flange 104*a* of the cam. The top end of each head 1 has therefore means 4, described in more detail hereinafter, arranged to carry out such cooperation. Optionally, rods 7 parallel to the axes of heads 1 can be provided, which cooperate, during the translational motion, with means 4 in order to prevent unwanted movements of the heads possibly occurring while the heads are advancing along cam 104.

Figure 2:
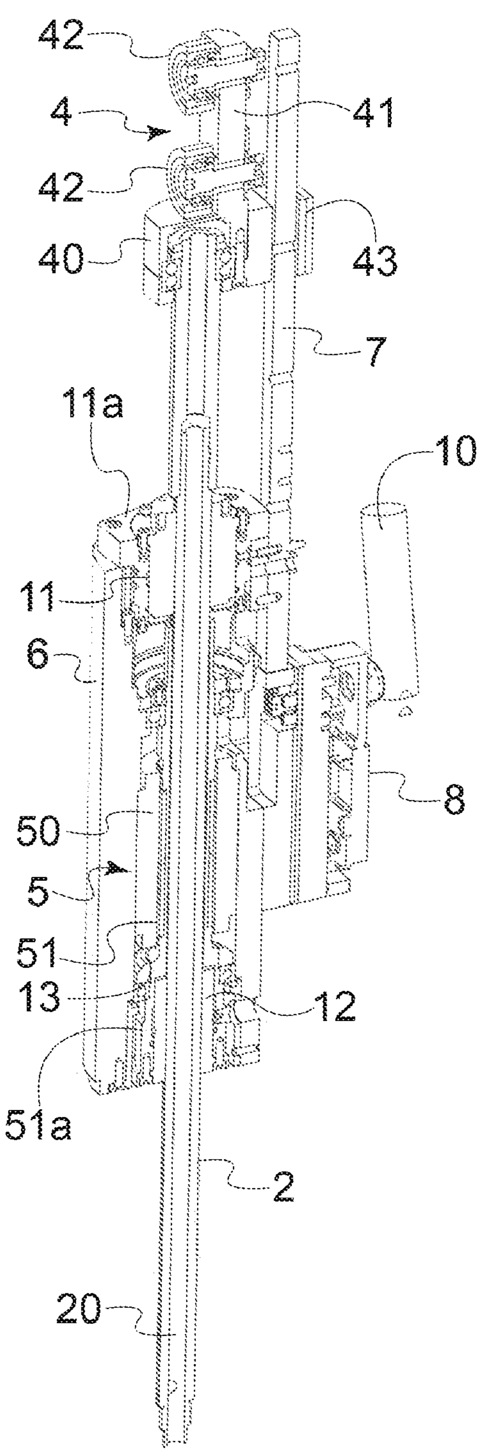
FIG. 2 is an enlarged axial cross-sectional and perspective view of a capping head according to the invention used in the turret shown in FIG. 1.
Figure 3:
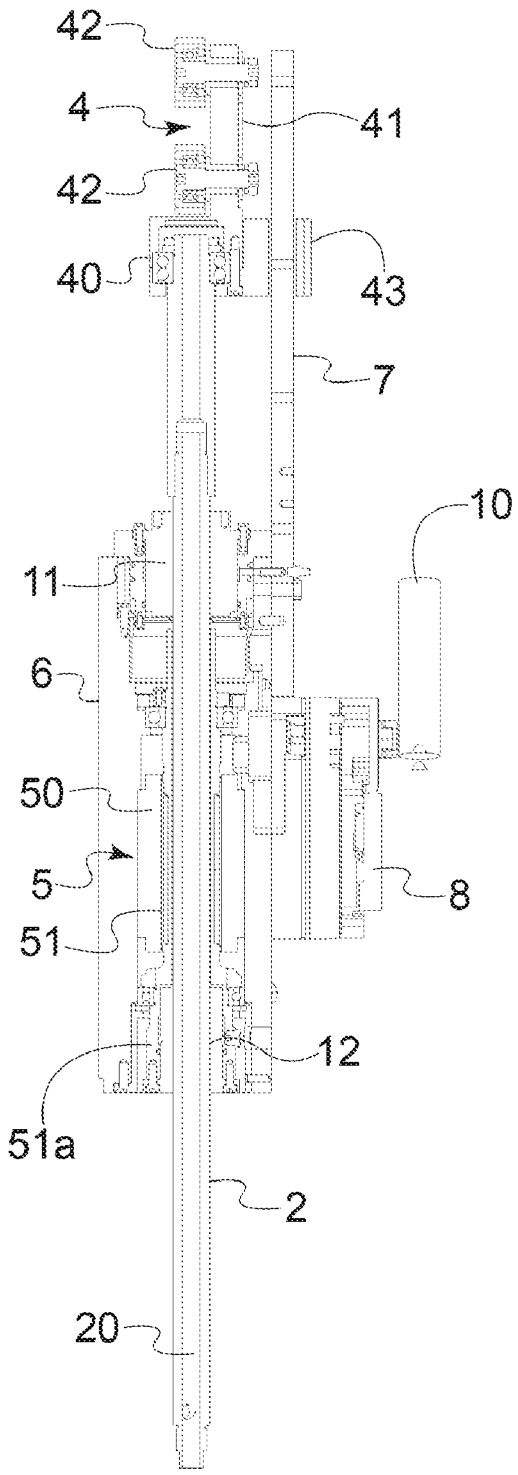
FIG. 3 is an enlarged axial cross-sectional and front view of a capping head according to the invention used in the turret shown in FIG. 1.

The rotary motion is instead imparted by a motor, more particularly a rotary electric motor, housed inside a housing 6 fastened to platform 101. The motor will be described in more detail below, with reference to FIGS. 2 and 3.

Housing 6 has fastened thereto guiding rod 7, and electronic components for power supply, control and monitoring of head 1 are also mounted on it. Such components are housed inside a component-holding box 8 at which cables 9 for power supply and reception and transmission of commands, signals and data terminate, such cables being received in suitable cable holders 10. Therefore, both boxes

8 and cables 9 terminating at them are not concerned by the translational and rotary movements of heads 1. In the drawing, the cables serially connect, in pairs, the components belonging to alternate heads 1, more particularly according to a daisy-chain arrangement. In other words, cables 9 connect together for instance first the heads in "odd" positions and the last "odd" head is connected to a first head in "even" position, which is in turn serially connected to the subsequent "even" heads. The first head in the chain is directly connected to a conventional rotary collector (not shown) carried by turret 100 and in turn connected in conventional manner to an external power source and to the control system of the capping machine.

The choice of the daisy chain arrangement is suggested by the fact that cables 9 employed are rather stiff and the connection of consecutive heads would cause excessively accentuated bending in the cables themselves.

It is to be appreciated that, in case of capping machines comprising a high number of heads 1, these could be divided into groups, for instance a first group comprising the heads in "odd" positions and a second group comprising the heads in "even" positions, and the cables serially connect, in pairs, alternate heads 1 in a same group. The different groups will then be connected to the rotary collector independently of one another.

The daisy-chain connection of the heads (or of the heads of the different groups) also enables dispensing with the multiple plug socket from which, in the conventional systems where the components are not mounted in stationary manner, the cables leading to the individual heads depart.

Referring now to FIGS. 2 to 5, a head 1 includes a rotating and translating shaft 2, the longitudinal axis of which is parallel to the axis of shaft 102 and which is equipped at its top end with the means 4 for guiding the movements of head 1 on cam 104 and along rod 7, and at its bottom end with the members for picking/releasing the caps (not shown). Shaft 2 is made as an integral piece and advantageously it has an axial cavity 9 intended for the passage of the means (not shown) actuating said members for picking/releasing the caps.

Motor 5 driving the rotation of shaft 2 comprises a stator 50 and a rotor 51, and stator 50 is fastened to the inner wall of housing 6 and is coaxially arranged around rotor 51. The latter is in turn arranged coaxially around shaft 2 and is decoupled therefrom as far as the translational motion is concerned so as to remain in a fixed axial position.

Figure 4:
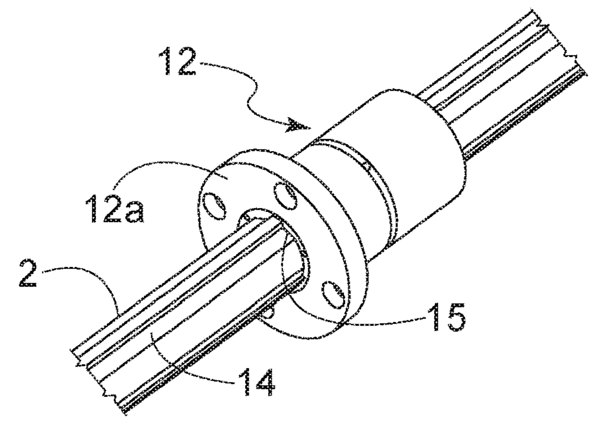
FIG. 4 is a perspective view of the bushing transmitting the rotary motion to the shaft.
Figure 5:
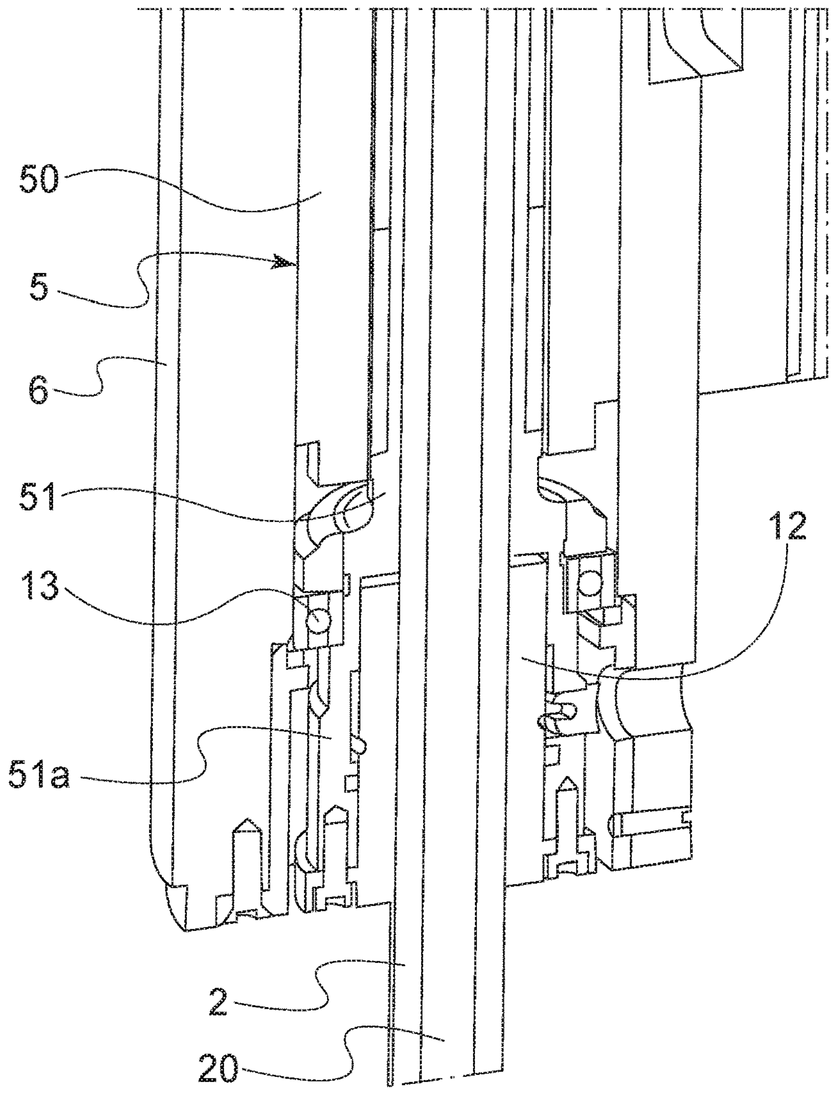
FIG. 5 is an enlarged cross-sectional view of the head portion where the bushing shown in FIG. 4 is mounted.

Shaft 2 is supported by two guiding bushings 11, 12, for instance recirculating ball bushings as shown in FIG. 4 for bushing 12, which are fastened to the end faces of housing 6 through suitable flanges 11*a* and 12*a* and seal the internal cavity of the housing, while however allowing axial sliding of shaft 2.

More particularly, shaft 2 is supported in freely rotatable manner by one of the bushings, in particular bushing 11 located at the top end of housing 6. The second bushing 12 is instead received within a cup-shaped bottom end portion 51*a* of rotor 51 and jointly rotates with the rotor. Rotor 51 thus extends substantially over the whole length of the internal cavity of housing 6, from the inner base of bushing 11 to flange 12*a* for fastening bushing 12 onto housing 6. Rolling bearings 13 between rotor 51 and the inner wall of housing 6 enable rotation of rotor 51 relative to the same housing.

Bushing 12 causes rotation of shaft 2 thanks to the cooperation between ribs 15 provided on the outer surface of shaft 2 and grooves 14 provided on the inner surface of bushing 12. Motion transmission can occur with the interposition of small balls (not shown).

Bushings 11, 12 are wholly conventional elements and a more detailed description thereof is not necessary for the understanding of the invention.

By such an arrangement of the components, motor 5 together with stationary housing 6 and the first and second bushings 11, 12 sealing the housing forms a self-standing module for driving rotation of shaft 2, independent of the manner in which translational motion of shaft 2 is driven.

As far as the latter motion is concerned, the means 4 cooperating with cam 104 and rod 7, if any, for generating and guiding such motion comprise a body 40 (hereinafter referred to also as "decoupling joint"), integral with the top end of shaft 2 and essentially consisting of a rolling bearing that is passed through by shaft 2 and that allows rotation thereof about its axis. Decoupling joint 40 has fastened thereto, in an easily detachable manner, an extension piece 41 vertically extending upwards, on which two cam follower rollers 42 with parallel horizontal axes, arranged to roll on the opposed faces of flange 104*a*, are mounted. Decoupling joint 40, or extension piece 41 supporting rollers 42, also has a cantilevered sleeve 43 in the cavity of which rod 7 slidably engages. Such an arrangement mainly aims at preventing rotation of body 40, and hence of shaft 2, when a change in the slope of flange 104*a* of cam 104 causes a torsion in shaft 2.

It is pointed out that, for the sake of simplicity of the drawing, components usually associated with the rotating and translating shaft of a capping head, such as the springs for applying the compression load, the angular position transducers (encoders) etc., are not shown in the Figure since they are not affected by the invention.

Figure 6:
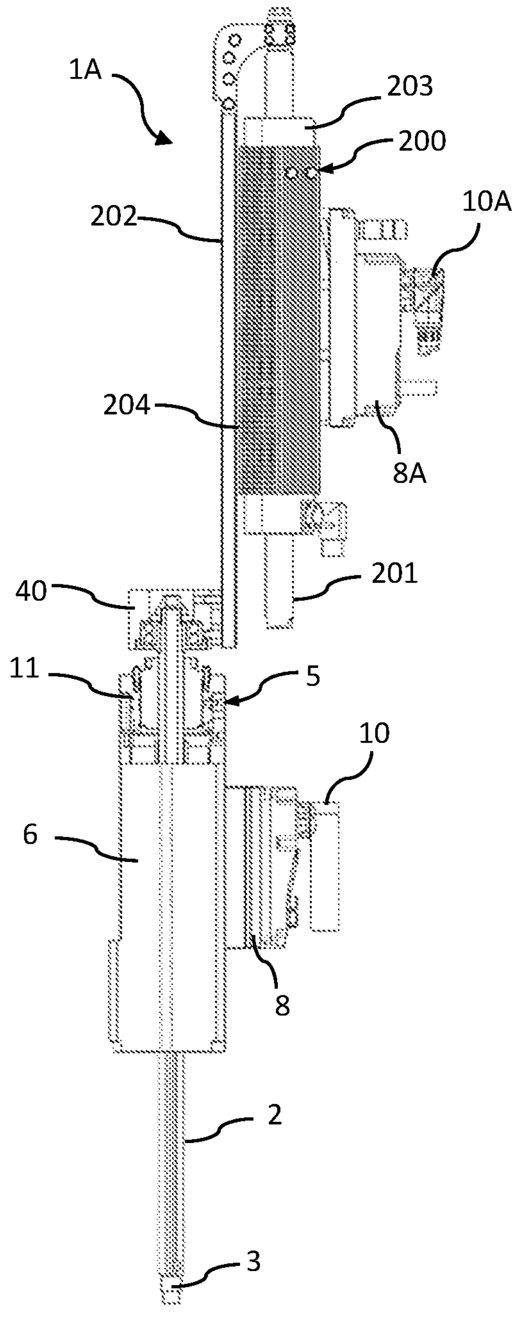
FIG. 6 is an enlarged axial cross-sectional view of a capping head according to the invention, in a second embodiment is which the translation is driven by an electric actuator.

FIG. 6 shows a second embodiment of the invention, in which the translational motion of head 1A is obtained by means of a linear actuator, for instance a second electric motor 200, implementing a so-called "virtual cam". The module driving rotation is identical to the one shown in the previous Figures and its components are denoted by the same reference numerals as used in such Figures. A piston 201 linearly slides inside that second motor 200 and it is made to translate jointly with decoupling joint 40 for instance by means of a rod 202 transmitting the linear motion. One end of that rod is fastened to the top end of piston 201, whereas the other end is fastened, in an easily detachable manner, to the outer race of the rolling bearing of decoupling joint 40. In this manner, during translation of piston 201, rod 202 drags shaft 2 with it. Reference numerals 203 and 204 denote the stationary housing and the heatsink, respectively, of motor 200. Housing 203 too is fastened to the stationary frame of turret 100 so that the components (i.e. rotor and stator) of the second motor 200 are decoupled form the movements of piston 201 and hence of shaft 2.

Moreover, similarly to what disclosed for motor 5, the electronic components for driving and monitoring motor 200 are housed inside a component-holding box 8A fastened to housing 203 of motor 200 and equipped with cable holders 10A at which the cables for power supply and reception and transmission of commands, signals and data terminate.

The invention actually solves the problems mentioned above.

Having a self-standing module for driving rotation of rotating and translating shaft 2, which module can be easily coupled either with piece 41 supporting the rollers or with rod 202 transmitting the linear motion, enables constructing machines where the drive for translational motion more convenient for the specific application is used, thereby dispensing, in particular, with use of a motor drive when this is not indispensable. Thus, a considerable power saving, the greater the higher the number of heads, can be achieved.

Besides the advantages related to power saving, a reduction in the number of parts to be kept in stock is achieved, in that a single module for driving rotation exists that can be directed to the production line either of machines with mechanical cams or of machines with linear motors. Moreover, if the needs of a client require so, a machine in which the module driving rotation is associated with a cam drive of the translation can be easily upgraded to a model with motor-driven translation by simply replacing roller-supporting piece 41 with transmitting rod 202 and linear actuator 200.

Additionally, having cables 9 terminating at boxes 8, 8A fastened onto housings 6, 203, which are elements mounted in stationary manner onto turret 100 and are not affected by the rotary and translational movements of head 1 they belong to, results in the same cables not hindering such movements and not running the risk of being damaged, without the need to provide a suitable movable wiring.

Moreover, shaft 2 made of a single piece and the motion transmission from bushing 12 to the shaft without need to employ particular shapes of the parts cooperating to this aim make constructing and assembling head 1 considerably simpler, thereby reducing the overall costs.

Lastly, no unit in the transmission chain of the rotary motion (and also no part of the linear actuator, when used in place of the cam) is translationally integral with shaft 2, so that the problems related to moving relatively heavy masses do not occur.

It is clear that the above description has been given only by way of non-limiting example and that changes and modifications are possible without departing from the scope of the invention as defined in the appended claims.

The invention claimed is:

1. A capping head (1, 1A) for applying pre-threaded caps to containers, including:

a shaft (2) movable according to a rotary motion about its axis and a translational motion along said axis;

a first electric motor (5) for driving the rotary motion of the shaft (2), the first electric motor (5) having a stator (50) and a rotor (51, 51*a*) coaxially arranged around the shaft (2) and mounted in a stationary housing (6) so as to be decoupled from the shaft (2) as far as the translational motion is concerned;

a first bushing (12), which is mounted at one end of the stationary housing (6) so as to seal the internal cavity thereof at said end, is passed through by the shaft (2) and is arranged to transfer the rotary motion of the rotor (51, 51*a*) to the shaft (2) thanks to the cooperation between ribs (15) provided on an inner surface thereof and grooves (14) provided on an outer surface of the shaft (2);

Wherein:

the head (1; 1A) further includes a second bushing (11) that is mounted at a second end of the stationary housing (6), opposed to the first one, so as to seal the internal cavity thereof also at that second end, and is passed through by the shaft (2) that is mounted in the same bushing (11) in a freely rotatable manner;

the first electric motor (5) forms, together with the stationary housing (6) and the first and second bushings (12, 11), a self-standing module for driving rotation of the shaft (2); and said module (5, 6, 11, 12) can be associated, for driving the translational motion, either with a member (41) carrying cam follower rollers (42) arranged to cooperate with a mechanical cam (104, 104*a*) along the whole of the path run by the head (1) during a capping operation, or with a second electric motor (200) arranged to impart the translational motion to the shaft (2).

2. The capping head (1; 1A) according to claim 1, wherein the shaft (2) is translatable jointly with a decoupling joint (40) that is mounted at the end of the shaft (2) proximal to the second bushing (11), to allow rotation of the same shaft (2) about its axis and can be fastened, in a detachable manner and so as to be jointly translatable, either to the member (41) carrying the cam follower rollers (42), or to a piston (201) that is moved by the second electric motor (200) according to a linear motion.

3. The capping head (1) according to claim 2, wherein the member (41) carrying the cam follower rollers (42) is associated with means (7, 43) for preventing, while the head (1) is advancing along the cam (104, 104*a*), unwanted rotary movements of the same head (1) occurring during the translational motion.

4. The capping head (1A) according to claim 2, wherein the decoupling joint (40) is fastened to the piston (201) by a rod (202) transmitting the linear motion imparted to the piston (201) by the second electric motor (200).

5. The capping head (1A) according to claim 4, wherein the second electric motor (200) is housed inside a housing (203) that is mounted so as to be stationary relative to the head (1A), in such a way that the components of the second motor (200) are decoupled from the movements of the piston (201) and hence of the shaft (2).

6. The capping head (1; 1A) according to claim 5, wherein the shaft (2) has an axial cavity (20) for driving cap-handling members carried by the same shaft (2).

7. The capping head (1; 1A) according to claim 6, wherein component-holding boxes (8; 8A) are mounted onto the stationary housings (6; 203) of the first electric motor (5) and, if provided, of the second electric motor (200), which boxes accommodate electronic components for supplying the motors (5; 200) with power and for controlling and monitoring the operations of the head (1; 1A), wherein cables (9) for the power supply and the reception and transmission of signals, data and commands from and to the components terminate at said boxes (8).

8. The capping head (1; 1A) according to claim 5, wherein component-holding boxes (8; 8A) are mounted onto the stationary housings (6; 203) of the first electric motor (5) and, if provided, of the second electric motor (200), which boxes accommodate electronic components for supplying the motors (5; 200) with power and for controlling and monitoring the operations of the head (1; 1A), wherein cables (9) for the power supply and the reception and transmission of signals, data and commands from and to the components terminate at said boxes (8).

9. A capping machine (100) comprising at least one capping head (1; 1A) according to claim 8.

10. The capping machine (100) according to claim 9, comprising a plurality of capping heads (1; 1A) carried by a common support (101) moving said heads (1; 1A) by following a path along which the containers to be capped are conveyed, wherein the cables (9) for the power supply and the reception and transmission of signals, data and commands terminating at the individual heads (1; 1A) connect in series, in pairs, heads (1; 1A) arranged in alternate positions on the support (101), the series of heads (1; 1A) being directly connected to a collector carried by the common support (101).

11. The capping machine (100) according to claim 10, wherein the cables (9) for the power supply and the reception and transmission of signals, data and commands connected to the individual heads (1; 1A) connect in series, in pairs, alternate heads (1; 1A) belonging to different head groups, each group of serially connected heads (1; 1A) being in turn directly connected to said collector independently of the other groups.

12. A capping machine (100) comprising at least one capping head (1; 1A) according to claim 1.

13. The capping machine (100) according to claim 12, comprising a plurality of capping heads (1; 1A) carried by a common support (101) moving said heads (1; 1A) by following a path along which the containers to be capped are conveyed, wherein cables (9) for the power supply and the reception and transmission of signals, data and commands terminating at the individual heads (1; 1A) connect in series, in pairs, heads (1; 1A) arranged in alternate positions on the support (101), the series of heads (1; 1A) being directly connected to a collector carried by the common support (101).

14. The capping machine (100) according to claim 13, wherein the cables (9) for the power supply and the reception and transmission of signals, data and commands connected to the individual heads (1; 1A) connect in series, in pairs, alternate heads (1; 1A) belonging to different head groups, each group of serially connected heads (1; 1A) being in turn directly connected to said collector independently of the other groups.

15. The capping head (1) according to claim 1, wherein the member (41) carrying the cam follower rollers (42) is associated with means (7, 43) for preventing, while the head (1) is advancing along the cam (104, 104*a*), unwanted rotary movements of the same head (1) occurring during the translational motion.

16. The capping head (1; 1A) according to claim 1, wherein the shaft (2) has an axial cavity (20) for driving cap-handling members carried by the same shaft (2).

* * * * *